Dec. 3, 1968     S. OLDBERG ET AL     3,414,292
INFLATABLE SAFETY DEVICE
Filed July 1, 1967     3 Sheets-Sheet 1
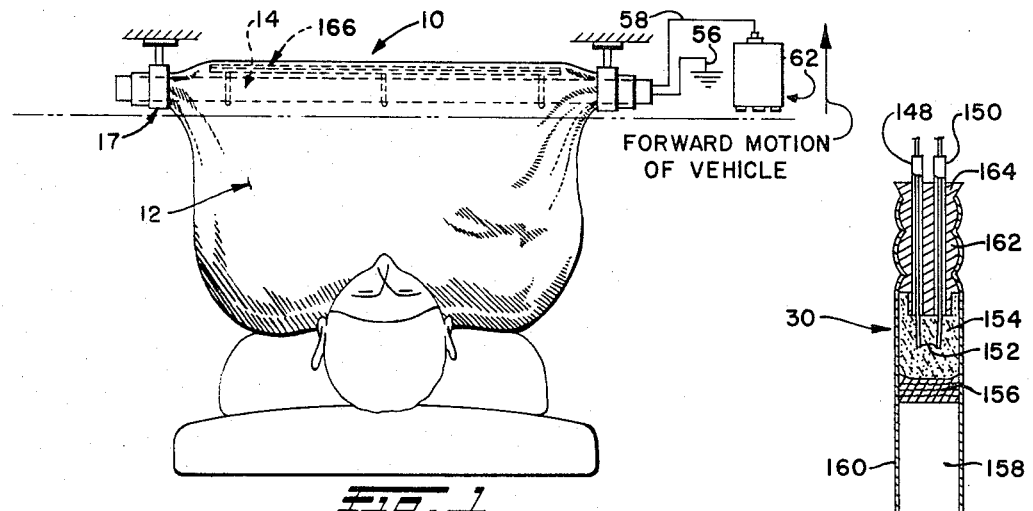
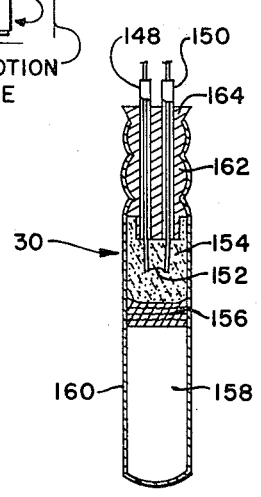
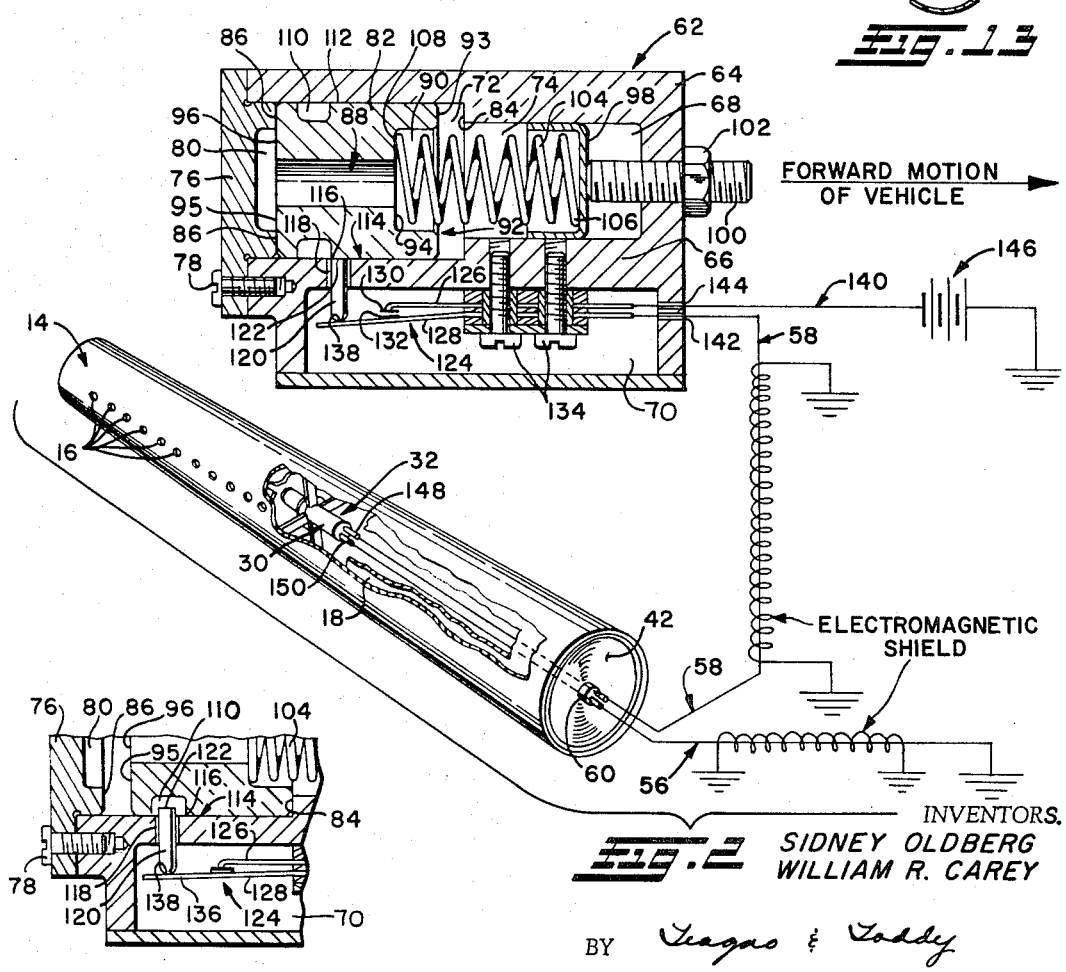
INVENTORS.
SIDNEY OLDBERG
WILLIAM R. CAREY
BY Teagno & Toddy
ATTORNEYS

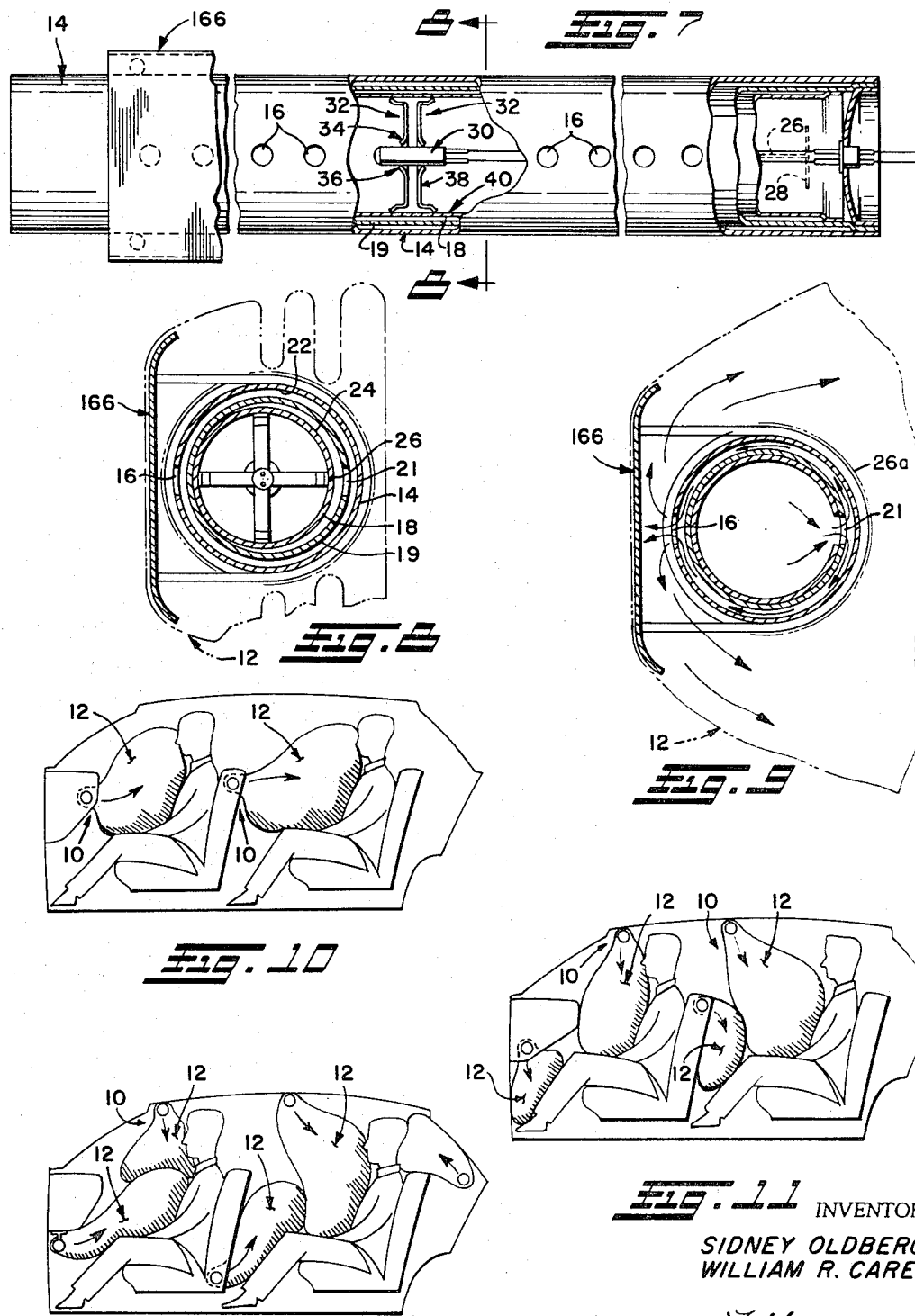

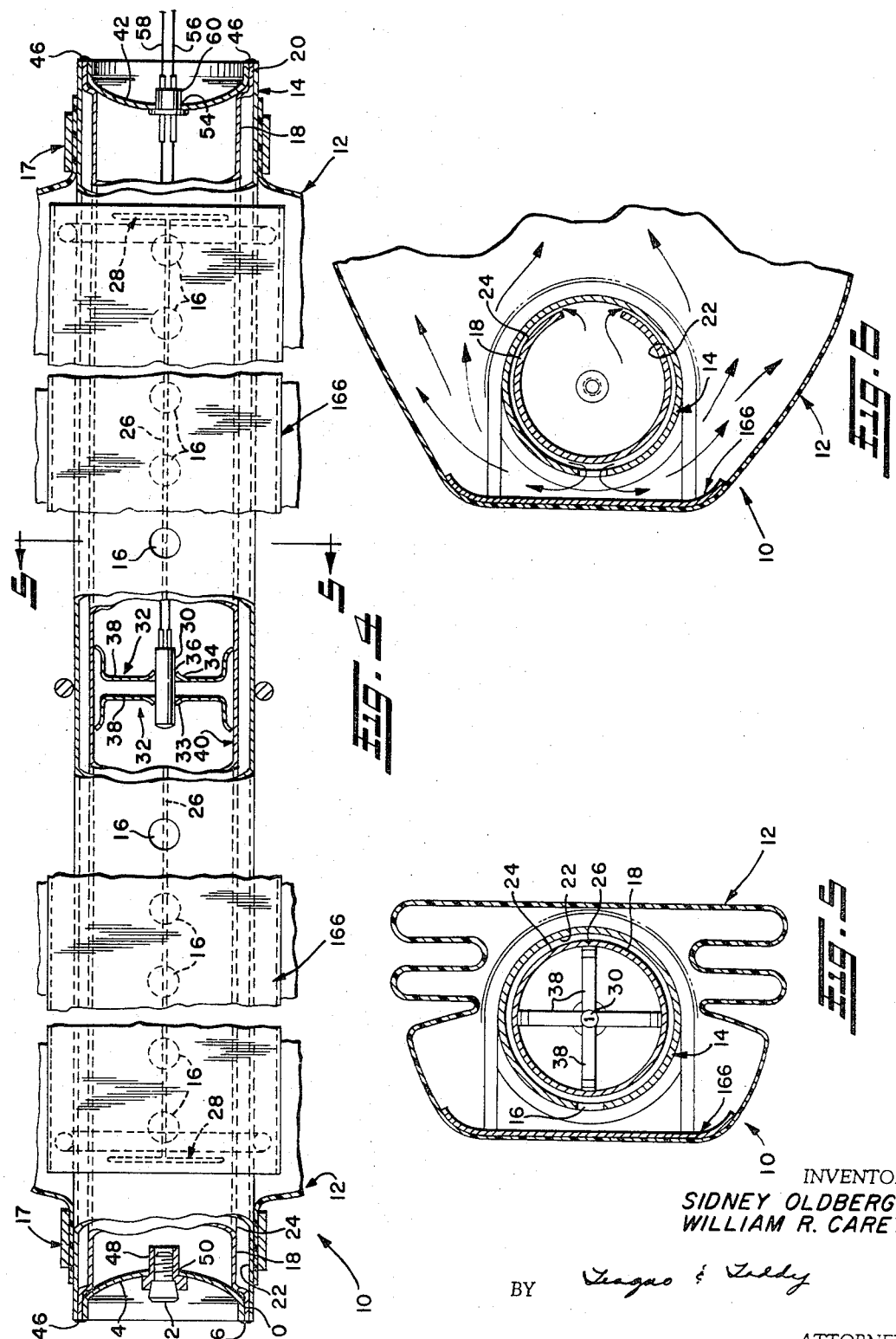

यह United States Patent है।

3,414,292
INFLATABLE SAFETY DEVICE

Sidney Oldberg, Birmingham, and William R. Carey, Farmington, Mich., assignors to Eaton Yale & Towne Inc., Cleveland, Ohio, a corporation of Ohio
Filed July 1, 1966, Ser. No. 562,289
29 Claims. (Cl. 280—150)

This invention relates to an inflatable safety crash bag that provides protection for vehicle passengers and is especially suited for aircraft, automobiles, speedboats, and other vehicles which travel on land, sea, or in the air, wherein the occupant thereof is protected from rapid or violent deceleration of the vehicle in which he is riding.

The object of this invention is to provide a rapidly inflatable confinement or crash bag that serves as an occupant restraint and that is automatically inflated by a high pressure gas which is released by an inertia responsive mechanism upon sensing a rapid vehicle deceleration, causing the inflatable crash bag to be inflated within a few milliseconds. This rapid inflation of the crash bag member will effectively restrain forward movement of a vehicle passenger when subjected to the rapid deceleration of an accidental stop, whereby the human passenger is prevented from coming in abrupt contact with structure of the vehicle.

Another object of this invention is to provide a rapidly inflatable ductile shield which is interposed between a structural member of a vehicle and the body of the passenger, whereby the forward momentum of the passenger is substantially absorbed or dampened by the inflatable shield.

A further object is the provision of an elongated rupturable reservoir or container for pressurized fluid having an explosive charge positioned therein; and with an inflatable bag being attached to the container so that rupture of the container along a stress riser therein, in response to firing of the explosive charge, will communicate the interior of the inflatable bag with the container through the stress riser.

In order for an inflatable crash container to substantially reduce injury to a vehicle passenger subjected to a sudden impact or rapid deceleration as the vehicle is traveling 30 m.p.h., the inflatable crash container must be fully inflated within a time range of from 40 to 60 milliseconds. Tests have shown it takes 130 milliseconds for a person's body to collide with the instrument panel or windshield of a conventional vehicle when the vehicle, traveling 30 m.p.h., collides with a stationary barrier. These tests have shown a passenger's body will move forward 4 to 6 inches relative to the passenger compartment in the time allowed (40 to 60 milliseconds) for expansion of the inflatable crash container. Thus, it is apparent the inflatable crash container must be fully inflated at the end of 60 milliseconds after sensing of a sudden deceleration by an inertia mechanism operatively connected to a source of pressurized fluid which inflates the crash container.

Other objects and purposes of this invention will be apparent to persons acquainted with vehicle passenger safety apparatus of this general type upon reading the following specification in conjunction with accompanying drawings.

In the drawings:

FIGURE 1 is a plan view of a vehicle compartment showing the inflatable crash bag of the present invention and the relationship between a vehicle occupant and the inflated bag.

FIGURE 2 is a diagrammatic view showing a detailed cross-section of the inertia responsive device electrically connected to an explosive charge disposed in a high pressure fluid container.

FIGURE 3 is a fragmentary sectional view of the inertia responsive switch mechanism in a closed or energizing position.

FIGURE 4 is an elevation view of an embodiment of the present safety device showing the arrangement of the baffle means with respect to the fluid discharge openings.

FIGURE 5 is a sectional view taken along line 5—5 of FIGURE 4.

FIGURE 6 is a sectional view taken along line 5—5 of FIGURE 4, however, in this view the explosive charge has been detonated to release the high pressure into the crash bag.

FIGURE 7 is an elevation of another embodiment of the present invention.

FIGURE 8 is a sectional view of the embodiment taken along line 8—8 of FIGURE 7.

FIGURE 9 is a sectional view of the embodiment taken along line 8—8 of FIGURE 7, however, in this view the explosive charge has been detonated to release the high pressure into the crash bag.

FIGURES 10, 11 and 12 are elevation views showing the various positions a crash bag may be placed in a vehicle to protect a passenger from impact and rebound caused by violent deceleration of an accidental stop.

FIGURE 13 is a cross-section of the explosive charge employed in the present invention.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal forward and reverse direction of travel of the vehicle to which the safety mechanism is attached. The words "inwardly" and "outwardly" will refer to directions toward and away from, respectively, the geometric center of the device and designated parts thereof. Said terminology will include the words specifically mentioned, derivatives thereof and words of similar import.

Referring in greater detail to the drawings wherein like numerals indicate similar parts throughout the several views, reference number 10 of FIGURE 1 discloses the inflatable crash bag assembly which includes an inflatable confinement or thermosetting or thermoplastic polymer crash bag or container 12 made of polyvinyl chloride, polyethylene or some other thermoplastic or thermosetting polymer composition or a ductile material having a high degree of plasticity which exhibits a high percent of elongation and low tensile strength which subjected to loading in tension. Such a thermoplastic or thermosetting polymer bag will be irreversibly deformed without rupture when a vehicle occupant is thrown against the inflated bag as a result of a rapid deceleration and thus minimize rebound of the occupant. It is well known physical properties such as hardness, modulus, flexibility, and rigidity of the thermoplastic or thermosetting polymer composition can be controlled by the amount of plasticizer or other compounding ingredients utilized therewith.

The inflatable crash bag 12 may completely enclose or only partially surround a diffuser member or first outer container 14 which has a plurality of fluid discharge openings 16, as shown in FIGURE 2, so constructed and arranged to direct fluid flow therethrough into the interior of bag 12. A plurality of bands or clamps 17 may releasably secure the crash bag 12 about outer container 14.

A fluid reservoir or an inner container 18, as shown in FIGURES 4, 5 and 6, has flange portions 20 which are deformed or swaged radially outwardly for frictionally contacting the interior wall surface 22 of outer container 14, thus the outer surface 24 of container 18 is spaced from the inner surface 22 of container 14, thereby creating a first fluid flow path therebetween. A reduced cross-section 26 for producing a stress riser forms an integral part of inner container 18. A stress riser being defined as a structure having a notch or any abrupt change in cross-section, whereby the maximum stress will occur at this change in cross-section and this maximum stress will be greater than the stress calculated by elementary formulas based upon simplified assumptions as to the stress distribution.

The stress riser 26 extends substantially along the entire longitudinal length of container 18 and is generally parallel to the geometric axis thereof. The manner of producing a stress riser 26 may be accomplished by numerous well-known and conventional means; for example, forming a groove on the surface of container 18, welding two ends of a metal plate which form container 18 together utilizing a weld-metal having a lower tensile strength than the parent metal or by brazing, etc. The longitudinally extending stress riser 26 intersects a plurality of similar stress risers 28 which extend generally transverse or normal to stress riser 26 and these stress risers 28 are usually located adjacent opposite ends of container 18. However, the stress risers 28 are not necessary to the operation of the present invention.

An explosive means in the form of an explosive charge 30 is generally positioned centrally within container 18 by a plurality of spider support elements 32 with each element 32 having a centrally disposed hub 34 including a bore 36 for slidably receiving and frictionally engaging the outer surface of explosive charge 30. A plurality of tab elements 38 extend radially outwardly from hub 33 and frictionally contact the inner surface 40 of container 18 to centrally position the explosive charge 30. It is readily apparent other means of positioning the explosive charge may be utilized without departing from the scope of the present invention.

A plurality of dished heads 42 and 44 as shown in FIGURE 4 are inserted in opposite ends of container 14 and are seam-welded at 46 to provide a fluid tight seal between heads 42 and 44 and inner container 18. An internally threaded coupling 48 is welded in opening 50 of dished head 44 or otherwise secured thereto to form a fluid tight connection therewith. The removable threaded male plug 52 and coupling 48 provides means whereby container 18 may be charged with a high pressure relatively inert fluid; for example, nitrogen, air, carbon dioxide, or some relatively inert gas mixture which is compatible to human beings. The opposite dished head 42 contains a feed thru connector 54 having electrical wires 56 and 58 extending therethrough and connecting the explosive charge 30 to a source of electrical energy; in this case, the battery of the vehicle. A fluid seal 60 contains a plurality of holes for receiving and supporting wires 56 and 58 in addition to providing a fluid seal between the wires and dished head 42.

An inertia responsive device 62, as shown in FIGURE 2, has a housing 64 divided by wall 66 into chambers 68 and 70. Chamber 68 has an enlarged portion 72 of greater cross-sectional area than the remaining portion 74 of chamber 68. The enlarged chamber portion 72 is located adjacent removable cover 76 which is removably secured to housing 64 by a plurality of threaded studs or screws 78. The removable cover 76 closes one end of chamber 68 and has a recess 80 in axial alignment with and having the same cross-sectional area and configuration as chamber portion 68. An inertia mass or weight 82 is reciprocally disposed within the enlarged portion 72 for movement in one or another direction. A plurality of stop or abutment surfaces 84 and 86 formed by the surface areas which interconnect the differential cross-sectional areas created by chambers 68, 74 and 80, limit the longitudinal movement of the inertia mass element 82. The inertia mass 82 has an elongated body with a bore 88 extending generally therethrough and having its geometric axis aligned with chamber portions 68, 70 and 80. An enlarged recess 90 located on one end 92, of inertia mass 82 has a greater cross-sectional area than bore 88 and possesses a relatively flat bottom wall 94 which intersects bore 88. A portion of the remaining surface area 93 of one end 92 abuts surface 84 whenever the mass 82 moves its complete longitudinal extend in said one direction and a portion of surface area 95 on the opposite end 96 of mass 82 abuts surface 86 when the mass 82 moves its complete longitudinal extent in another direction.

A spring retainer 98 is disposed in chamber 68 and is adjustably positioned therein by set screw 100 which threadedly engages housing 64 and is secured in position by a lock nut 102. This adjustment feature is neither essential or required in the present device; inasmuch as a spring 104 could be designed to have the proper deflection rate and could completely fill chamber portion 68. The spring or biasing member 104 has one end 106 bearing against spring retainer 98 while the opposite end 108 bears against bottom wall 94 to bias surface area 95 of intertia mass 82 into abuting engagement with surface 86.

An annular recess 110, as shown in FIGURES 2 and 3, located adjacent opposite end 96 interrupts the outer surface 112 of inertia mass 82 and a cam surface 114 located on outer surface 112, extends from the inner edge 116 of the recess 110 toward one end 92. The dividing wall portion 66 has a hole 118 containing a cam follower 120 having an end surface 122 extending therethrough for contacting cam surface 114. An electrical switch 124 including two resilient leaf members 126 and 128 have at least two opposed contact surfaces 130 and 132 connected respectively thereto. A plurality of bolts 134 threadedly connect switch 124 to wall portion 66 thereby providing an anchor for members 126 and 128. A plurality of insulating and spacing elements are provided to electrically insulate members 126 and 128 from each other respectively, and the wall portion 66 and bolts 134. The leaf member 128 has a portion 136 extending beyond contact 132 for contacting the other end surface 138 of cam follower 120. Since cam follower 120 is slightly longer than would be required for a normal contacting or switch closing relationship between opposed contacts 130 and 132, the electrical switch 124 is in the normally opened position when surface 122 of cam follower 120 is engaging cam surface 114.

Electrical wires 58 and 140 extend through respective openings 142 and 144 in a side wall of chamber 70, in sealed relationship therewith. One end of wire 140 is connected to a source of electrical energy; for example, the battery 146 of a vehicle, with the opposite end being connected to electrical switch leaf member 126 and wire 58 is connected to electrical switch leaf member 128, with the opposite end thereof being connected to leg wire 148 of explosive charge 30.

The explosive charge shown in FIGURE 13 includes two leg wires 148 and 150 interconnected by a bridge wire 152 which acts as an electrical resistance to the flow of electric current therethrough, to produce sufficient heat in response to a predetermined current, to ignite the ignition mix 154 which subsequently fires the primer charge 156, thereby exploding the base charge 158. A metal jacket 160 partially encloses the above mentioned components to form explosive charge 30 and a rubber plug 162 acts as a closure for open end 164 of the metal jacket 160 and additionally supports and insulates leg wires 148 and 150 from metal jacket 160. The wire 56 electrically interconnects electrical explosive leg wire 150 to ground thereby completing the electric circuit. Both electric wires 56 and 58 are electrically shielded from any external magnetic field created by an outside source; for example, a radio transmitter. The purpose of this electromagnetic shield is to prevent premature or impromptu detonation of the explosive charge 30.

FIGURES 4–6 disclose another embodiment of the present invention. In the inflatable bag assembly 10 of FIGURES 4–6 a baffle 166 is fixedly disposed by conventional means oposite fluid discharge outlets 16. The purpose of baffle 166 is to (1) redirect and divide the fluid flow being discharged through openings 16, and (2) to absorb, attenuate, alleviate, or dampen the sonic shock waves, or a concentration of forces if any, created by firing the explosive charge 30 and thereby prevent rupture of inflatable bag 12. The inflatable crash bag assembly 10 may be mounted by any number of conventional ways not shown on the structure of a vehicle. However, it has been found advantageous to provide an elongate recess in the dash or instrument panel of a vehicle, for mounting assembly 10 therein. The FIGURES 10, 11 and 12 in the drawing disclose various positions the assembly 10 may be mounted within a vehicle passenger compartment; for example, a recess may be provided in the front or rear seat in which the crash bag assembly may be positioned.

FIGURES 7, 8 and 9 disclose still another embodiment of the present invention showing a limiting member 19 interjacent spaced apart walls 22 and 24 for limiting outward deformation of inner container 18. The purpose of the limiting member 19 is to insure an adequate predetermined fluid flow path is maintained between outer wall 22 and inner wall 24. As illustrated in FIG. 9, the intermediate member 19 restricts movement of at least one portion 26a of the inner container 18 upon activation of the explosive. As a result, the configuration of the opening formed in the inner container 18 is controlled. The limiting member 19 as shown in FIGURE 7 is preferably an intermediate container positioned between inner container 18 and outer container 14. However, a plurality of spaced rings, bands, or other similar structure may be employed with equal effectiveness. In the embodiment shown in FIGURE 7, the intermediate container or limiting member 19 has a plurality of aligned apertures 21 disposed opposite stress riser 26 and angularly positioned approximately 180° relative to the openings 16 in outer container 14. This angular relationship of apertures 21 relative to openings 16 requires the fluid that is released from inner container 18 to reverse its direction of flow before being discharged through openings 16 into the interior of crash bag 12.

In the operation of this safety device, the inertia device 62 is mounted on the vehicle in advance of the passenger compartment. It is obvious when the vehicle encounters rapid or violent deceleration the potential energy retained by the inertia weight 82, in response to the linear speed of the vehicle, will be converted into kinetic energy and weight 82 will overcome the resistance of spring 104 and move forwardly until a portion of surface 93 contacts stop 84. With the weight 82 in its forward position, the end surface 122 of cam follower 120 completely clears corner 116 of cam surface 114. Accordingly, resilient leaf portion 136 biases cam follower 120 upwardly into annular recess 110 as shown in FIGURE 3, and simultaneously brings contacts 130 and 132 together to close the normally open switch 124, thereby energizing the electric circuit connecting battery 146 to explosive charge 30. The purpose of annular recess 110 and cam follower 126 is to prevent instantaneous rebound or rearward movement of weight 82 upon impact with stop 84. Therefore, in the present invention the rearward movement of weight 82 subsequent to the forward movement thereof is interrupted by the interlocking of cam follower 120 within recess 110. The purpose of which is to assure sufficient electrical current can be built up in the electric circuit to insure positive foring of explosive charge 30. The cam surface 114 may be beveled (not shown) or the surface 122 may be beveled or both surfaces 114 and 122 may be beveled (not shown). By utilizing the beveled surfaces noted above, the inertia weight 82, in its rearward movement would be temporarily delayed or restrained due to frictional surface contact between surfaces 114 and 122. Thus, the switch 124 would be restrained in a closed position for a sufficient length of time to insure positive firing of the explosive charge 30. The detonation of explosive charge 30 produces sonic waves with an accompanying instantaneous increase in pressure within inner container 18 for opening inner container 18 along longitudinally extending stress riser 26 and simultaneously outwardly deforming the inner container 18 toward outer container 14. Thus, pressurized fluid flows from the inner container 18 along the flow path created by spaced walls 22 and 24 and is subsequently discharged through aperture 16 into the interior of inflatable bag 12. In the event baffle 166 is employed, the fluid as it leaves aperture 16 impinges there against and is redirected to at least another flow path which is substantially transverse to the flow path emanating from aperture 16.

From the above description it should be readily apparent that applicant's have provided a new and improved inflatable safety crash bag for use by vehicle occupants. It should be also apparent that certain modifications, changes and adaptations may be made in the structure of the disclosed, and it is hereby intended to cover all such modifications, adaptations, and constructions which fall within the scope of the appended claims.

Having described our invention, we claim:

1. Safety apparatus for protecting an occupant of a vehicle, said safety apparatus comprising an expandable occupant restraint having a contracted condition, a reservoir for containing a supply of fluid, means operable to provide for fluid flow from said reservoir to said occupant restraint to dispose said occupant restraint adjacent an occupant of a vehicle during a collision for limiting movement of the occupant during such collision, said occupant restraint comprising confinement means formed of a material which is substantially irreversibly expandable to increase the volume thereof in response to movement of the occupant relative to the confinement means to absorb at least a part of the kinetic energy of the occupant created by such movement and thereby minimize rebound of the occupant therefrom.

2. Safety apparatus as defined in claim 1 wherein said material of which said confinement means is formed comprises a ductile material having a high degree of plasticity and a high percent of elongation when subjected to loading in tension.

3. Safety apparatus as defined in claim 1 further including a diffuser member associated with said reservoir for directing the flow of fluid to said confinement means to effect expansion thereof.

4. Safety apparatus as defined in claim 1 wherein said means operable to provide for fluid flow from said reservoir to said occupant restraint comprises explosive means for effecting the formation of an opening in said reservoir.

5. Safety apparatus for protecting an occupant of a vehicle, said safety apparatus comprising a confinement having a collapsed inoperative condition and an expanded operative condition, said confinement when in said expanded operative condition being effective to restrain movement of an occupant of a vehicle during a collision, a reservoir for containing a supply of fluid for expanding said confinement, explosive means operable to effect the formation of an opening in said reservoir by effecting movement of at least one portion of said reservoir to provide for flow of fluid therefrom, and means for controlling the configuration of the opening formed in said reservoir by restricting movement of said portion of said resrevoir upon detonation of said explosive means.

6. Safety apparatus as defined in claim 5 wherein said means for controlling the configuration of said opening formed in said reservoir comprises a member associated with said reservoir and positioned adjacent thereto.

7. Safety apparatus as defined in claim 5 wherein said means for controlling the configuration of said opening comprises a member enclosing at least that portion of said reservoir in which said opening is formed.

8. Safety apparatus as defined in claim 1 further including a diffuser member defining a chamber in which at least a part of said reservoir is located and said means for controlling the configuration of the opening formed in said reservoir comprises a member interposed between said diffuser member and said reservoir.

9. Safety apparatus as defined in claim 8 wherein said diffuser member is disposed to change the direction of the fluid flow from said reservoir and further including a baffle member located in the path of fluid flow from said diffuser member and for redirecting said fluid flow to said confinement.

10. Safety apparatus as defined in claim 8 wherein said diffuser member has a longitudinal axis and a plurality of outlet openings spaced along the longitudinal axis thereof.

11. Safety apparatus for protecting an occupant of a vehicle, said safety apparatus comprising a confinement having a collapsed inoperative condition and an expanded operative condition, said confinement when in said expanded operative condition being effective to restrain movement of an occupant of a vehicle during a collision, first and second baffle members, a reservoir for containing a supply of fluid for expanding said confinement, means for effecting the formation of an opening in said reservoir to provide for fluid flow therefrom in a first general direction toward said first baffle member, said first baffle member having a surface portion in the path of fluid flow from said reservoir for redirecting at least a substantial portion of said fluid flow in another direction toward said second baffle member, said second baffle member having a surface portion for changing the direction of said fluid flow to substantially said first general direction and to said confinement with said first and said second baffle members being effective to absorb a portion of the kinetic energy of said flowing fluid, and said reservoir being located intermediate said surface portions of said first and said second baffle members and being at least in part in the path of fluid flow in said another direction toward said second baffle member.

12. Safety apparatus as defined in claim 11 wherein said first baffle member comprises a diffuser member defining a chamber in which said reservoir is at least in part located.

13. Safety apparatus as defined in claim 11 wherein said means for effecting the formation of an opening in said reservoir comprises explosive means operable to effect movement of at least one portion of said reservoir to provide for flow of fluid therefrom and further including means for controlling the configuration of the opening formed in said reservoir by restricting movement of said portion of said reserovir upon detonation of said explosive means.

14. Safety apparatus as defined in claim 13 wherein said means for controlling the configuration of the opening comprises a member interposed between said diffuser member and said reservoir.

15. Safety apparatus for protecting an occupant of a vehicle, said safety apparatus comprising a confinement having a collapsed inoperative condition and an expanded operative condition, said confinement when in said expanded operative condition being effective to restrain movement of an occupant of a vehicle during a collision, structure operable to supply fluid for expanding said confinement, means operable to effect the formation of an opening in said structure to provide for flow of fluid from said structure, and a member disposed in the path of flow of fluid from said structure for controlling the formation of the opening therein.

16. Safety apparatus as defined in claim 15 further including a diffuser member located in the path of fluid flow.

17. Safety apparatus as defined in claim 66 wherein said diffuser member defines a chamber in which at least a part of said structure is located.

18. Safety apparatus as defined in claim 66 wherein said diffuser member and said structure are located in said confinement.

19. Safety apparatus as defined in claim 66 wherein at least a part of said diffuser member has a plurality of spaced apart openings therein.

20. Safety apparatus as defined in claim 19 wherein said part of said diffuser member is located in said confinement.

21. Safety apparatus for protecting an occupant of a vehicle, said safety apparatus comprising a confinement having a collapsed inoperative condition and an expanded operative condition, said confinement when in said expanded operative condition being effective to restrain movement of an occupant of a vehicle during a collision, a reservoir for containing a supply of fluid for expanding said confinement, explosive means for effecting the formation of an opening in said reservoir, a diffuser member for diffusing and directing said fluid flow to said confinement, and a member disposed intermediate said diffuser member and said reservoir for controlling the formation of the opening in said reservoir.

22. Safety apparatus as defined in claim 21 wherein said explosive means effects the formation of an opening in said reservoir by effecting movement by at least one portion of said reservoir and said member is operable to control the configuration of the opening formed in said reservoir by restricting movement of said portion of said reservoir.

23. Safety appaartus as defined in claim 21 wherein said diffuser member defines a chamber in which at least a part of said reservoir and a part of said member are located.

24. Safety apparatus for protecting an occupant of a vehicle, said safety apparatus comprising a confinement having a collapsed inoperative condition and an expanded operative condition, said confinement when in said expanded operative condition being effective to restrain movement of an occupant of the vehicle during a collision, structure operable to supply fluid for expanding said confinement, explosive means for effecting the formation of an opening in said structure, and a member operatively associated with said structure and disposed intermediate said structure and said confinement for controlling the formation of the opening in said structure.

25. Safety apparatus for protecting an occupant of a vehicle, said safety apparatus comprising a confinement having a collapsed inoperative condition and an expanded operative condition, said confinement when in said expanded operative condition being effective to restrain movement of an occupant of the vehicle during a collision, said confinement including means for dissipating the kinetic energy of the occupant to minimize rebound of the occupant therefrom, structure operable to supply fluid for expanding said confinement, explosive means operable to provide for flow of fluid from said structure, a diffuser member disposed in the path of flow of fluid from said structure and effective to control said flow to said confinement, and a member interposed between said confinement and said structure for controlling the formation of an opening in said structure by said explosive means.

26. Safety apparatus as defined in claim 25 wherein said diffuser member has a plurality of spaced apart openings located within said confinement.

27. Safety apparatus as defined in claim 26 wherein said diffuser member has a surface for directing at least a portion of the flow of fluid in a direction opposite the direction in which the fluid flows from said structure and further including a baffle member having a surface for changing the direction of flow of fluid to substantially the general direction in which the fluid flows from said structure.

28. Safety apparatus as defined in claim 26 wherein said confinement is made of a material which is substantially irreversibly expandable to increase the volume thereof in response to movement of the occupant relative to the confinement.

29. Safety apparatus for protecting an occupant of a vehicle, said safety apparatus comprising a confinement having a collapsed inoperative condition and an expanded operative condition, said confinement when in said expanded operative condition being effective to restrain movement of an occupant of the vehicle during a collision, a fluid reservoir for containing a supply of fluid for expanding said confinement, means operable to provide for flow of fluid from said reservoir, a diffuser member disposed in the path of flow of fluid from said reservoir and effective to control said flow, said diffuser member defining a chamber in which said reservoir is at least in part located and into which fluid flows from said reservoir, and said diffuser member including a plurality of spaced apart openings therein disposed within said confinement for providing for flow of fluid from said chamber through said diffuser member and to said confinement, said means operable to provide for flow of fluid from said reservoir comprising explosive means operable to effect the formation of an opening in said reservoir and further including a member interposed between said diffuser member and said reservoir for controlling the formation of said opening by said explosive means.

References Cited

UNITED STATES PATENTS

| | | | |
|---|---|---|---|
| 3,243,822 | 4/1966 | Lipkin | 2—2 |
| 2,834,606 | 5/1958 | Bertrand | 280—150 |
| 2,850,291 | 9/1958 | Ziccardi | 280—150 |
| 2,957,415 | 10/1960 | Lazari | 102—28 |
| 3,197,234 | 7/1965 | Bertrand. | |
| 3,224,924 | 12/1965 | Von Ardenne et al. | 161—68 |

BENJAMIN HERSH, *Primary Examiner.*

E. SIEGEL, *Assistant Examiner.*

UNITED STATES PATENT OFFICE
CERTIFICATE OF CORRECTION

Patent No. 3,414,292                                         December 3, 1968

Sidney Oldberg et al.

It is certified that error appears in the above identified patent and that said Letters Patent are hereby corrected as shown below:

Column 6, line 75, claim reference numeral "1" should read -- 5 --. Column 7, lines 72 and 75, and column 8, line 3, claim reference numeral "66", each occurrence, should read -- 16 --.

Signed and sealed this 10th day of March 1970.

(SEAL)
Attest:

Edward M. Fletcher, Jr.                               WILLIAM E. SCHUYLER, JR.
Attesting Officer                                             Commissioner of Patents